United States Patent [19]

Rushing et al.

[11] 3,781,095
[45] Dec. 25, 1973

[54] REFLECTOR

[75] Inventors: Frank C. Rushing, Ellicott City, Md.; Lynford W. Gilbert, Palos Verdes Peninsula, Calif.

[73] Assignee: Westinghouse Electric Corporation, Pittsburgh, Pa.

[22] Filed: Dec. 8, 1969

[21] Appl. No.: 883,017

[52] U.S. Cl. ................................ 350/310, 350/288
[51] Int. Cl. ............................................. G02b 7/18
[58] Field of Search .................... 350/288, 293, 295, 350/310; 272/65; 273/26 A

[56] References Cited
UNITED STATES PATENTS
3,326,624  6/1967  Von Maydell et al. ............. 350/288
3,367,661  2/1968  Dean ...................................... 272/65
FOREIGN PATENTS OR APPLICATIONS
249,236   0/1964  Australia .............................. 272/65

Primary Examiner—Ronald L. Wibert
Assistant Examiner—Michael J. Tokar
Attorney—F. H. Henson, E. P. Klipfel and D. F. Straitiff

[57] ABSTRACT

Described is an improvement in a thin membranous reflector having a continuous array of inwardly bending support cable means around its perimeter for stretched-flat tension-spring support at discrete outwardly extending apex locations of such array. The improvement resides in imparting a creep characteristic to such cable means which matches that of the reflector membrane while subjected to the flatness-inducing tensioning thereof, in behalf of assuring preservation of a stretched-flat state of such membrane for a prolonged period of time.

3 Claims, 3 Drawing Figures

PATENTED DEC 25 1973  3,781,095

WITNESSES:
Bernard R. Giegner
James F. Young

INVENTORS
Frank C. Rushing and
Lynford W. Gilbert.
BY W. F. Straitiff
AGENT

REFLECTOR

BACKGROUND OF THE INVENTION

1. Field of the Invention:

Compactable, light weight, planar reflectors.

2. Description of the Prior Art:

It has been proposed heretofore to place a planar reflector in orbit above the earth to reflect energy from the sun onto selected earth areas for purposes such as lighting and heating. It also has been proposed by Frank C. Rushing et al., in copending U.S. Pat. applications Ser. Nos. 883,016 and 883,018 filed concurrently herewith, to provide a lightweight reflector construction suitable for such solar reflection purpose which embodies a membranous reflector having a continuous series of inwardly curving edge support cable means around its perimeter which are supported and tensioned by support springs at coplanar intersection points of such cables for stretched-flat support of such reflector membrane. Since it is contemplated that the reflector membrane be made of a relatively strong thin plastic film material, such as sold under the trade name Mylar, a polyethylene glycol terephthalate, on which is vapor deposited a reflective coating of aluminum, for example, it is envisioned that a problem may arise with respect to obtaining and maintaining such reflector membrane stretched flat under influence of the tension spring forces applied to the cables around its edges, in view of the creep characteristic of such plastic material.

SUMMARY OF THE INVENTION

The present invention, in providing edge support cable means having a creep characteristic matching that of the reflector membrane it supports, a uniform biaxial stress can be developed and maintained in the reflector membrane to maintain such membrane stretched flat under imposition of constant tensioning by the support springs for a considerable period of time, and which furthermore facilitates initial establishment of the flatness state of the reflector membrane during erection of same from a compacted stowed condition in which it may be transported into space.

DESCRIPTION OF THE PREFERRED EMBODIMENTS

Figure 1:
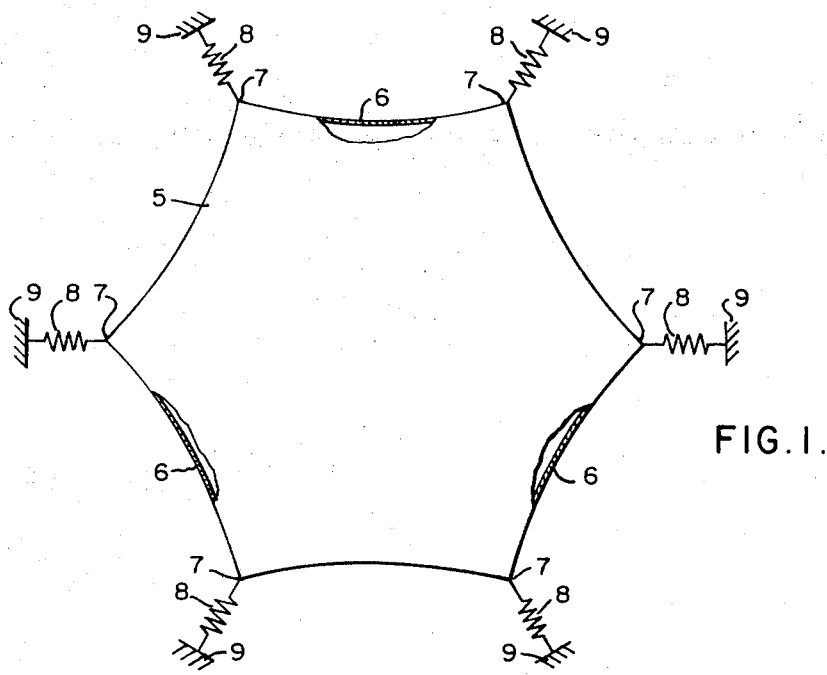
FIG. 1 is a plan view of a spring supported membranous reflector assemblage of the type to which the invention relates.

Referring to FIG. 1 the reflector of the present invention comprises a flexible membrane 5 of relatively strong plastic thin film material such as sold under the trade name Mylar, for example, having a reflective coating such as vapor deposited aluminum of one face thereof. Such plastic membrane 5 can be folded and/or rolled up for storage, as during compaction and deployment into space for subsequent unfurling, and can be pulled flat into a planar mirror configuration in which it is shown in the drawings. The perimeter of the membrane 5 is defined by a continuous array of concave curvilinear edges reinforced by flexible cables 6 which merge at a plurality of apices 7 spaced at equal intervals around such perimeter. By exertion of equal pulling forces radially outward from the apices 7, via tension springs 8, the cable-supported inwardly curved edges transform such radial forces into biaxial stress of the membrane 5. All of the springs 8 are anchored at support points 9 located in a common plane, hence such springs draw the membrane 5 taut into a planar configuration.

Referring to FIG. 1, in accord with one embodiment of the present invention, the edge support cables 6 are made to have the same creep characteristics as that of the membrane 5, hence preferably are made of the same material and proportioned to have the same unit stress as that of such membrane. Preferably each curved edge of membrane 5 will be arcuate, of constant radius r with respect to its length, as will the cable 6 affiliated with such edge, and each cable will be attached continuously along the respective membrane edge. Under continuous tension load from the tension springs 8, any creep of the membrane material and support cables 6 will result in equal enlargement of the overall membrane assemblage, membrane 5 and cables 6, as indicated in dotted outline in FIG. 2, to maintain biaxial tension stress equality in such membrane and thereby preserving ripply-free flatness integrity thereof. The radius of curvature of the cable 6 will increase with such creep, but its attitude with respect to springs 8 will remain unaltered. During initial unfurling, any nonuniformity in stresses which may be introduced in the membrane 5 due to dimensional inaccuracies will result in non-uniform stress patterns, but the higher stressed areas will experience greater creep until stress and creep equality is thus established automatically. The tension springs 8 can be so designed as to deliver relatively high creep-inducing tension forces on the membrane assemblage initially to expedite realization of flatness, and to subsequently partially relieve such forces as creep expansion and resultant spring shortening progresses.

Figure 2:
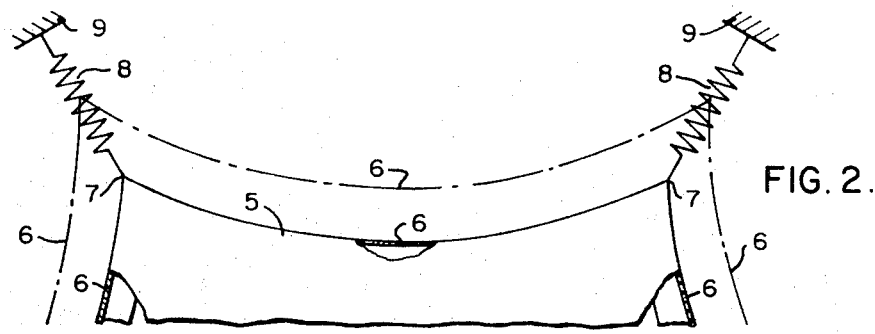
FIG. 2 is a plan view of a segment of the reflector assemblage of FIG. 1, showing schematically one embodiment of the present invention.
Figure 3:
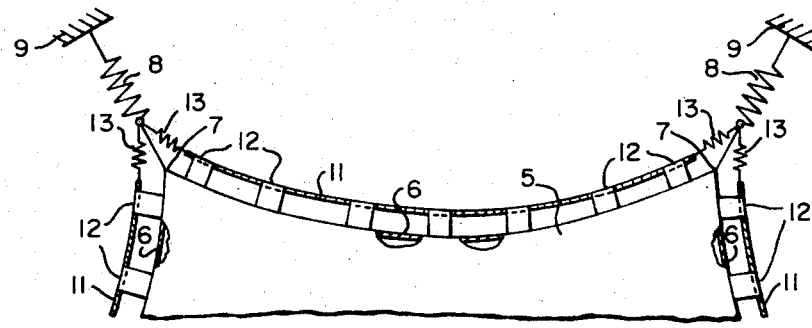
FIG. 3 is a similar view of an alternate embodiment of the present invention.

Referring to FIG. 3, the plastic creep-matching edge support cables 6 of FIG. 2 are assisted by parallel metal cables 11 which are coupled to the cables 6 via sleeve or loop members 12 anchored to such cables 6 but free to slide along such cables 11. Opposite ends of the metal cables 11 are supported by zero-rate springs 13, negators, anchored to the main support springs 8. As the plastic membrane 5 and plastic edge cables 6 expand during creep, the negators 13 permit the constantlength metal cables 11 to assume the larger-radius configuration of the creep-elongated plastic cables 6 while maintaining the desired support assistance.

We claim as our invention:

1. An improved reflector comprising, a flexible reflector membrane of visco-elastic material having a continuous series of concave edge regions defining its perimeter which intersect at spaced-apart apices as primary support regions for accepting radial tension forces, and edge support cable means attached to said membrane about its perimeter coextensively with its concave edge regions to transmit such radial tension forces at the apices into biaxial tensioning of such membrane, wherein the improvement resides in making said edge support cable means also of a visco-elastic material and of such proportions as to experience the same degree of creep as that of said membrane under sustained application of said radial tension forces.

2. The reflector of claim 1, wherein said visco-elastic material of which said cable means is made is the same as that of said membrane.

3. The reflector of claim 1, further comprising,
second cable means of non visco-elastic material arranged parallel to said first cable means,
support means slidable along said second cable means affixed to said visco-elastic cable means, and
constant-tension spring means connecting ends of respective sections of said second cable means to said primary support regions.

* * * * *